Aug. 8, 1944.  S. M. HODSDON  2,355,160
SNOW HANDLING APPARATUS
Filed Aug. 6, 1943  2 Sheets-Sheet 1

INVENTOR.
Sumner M. Hodsdon.
BY Walter Fon, Attorney.

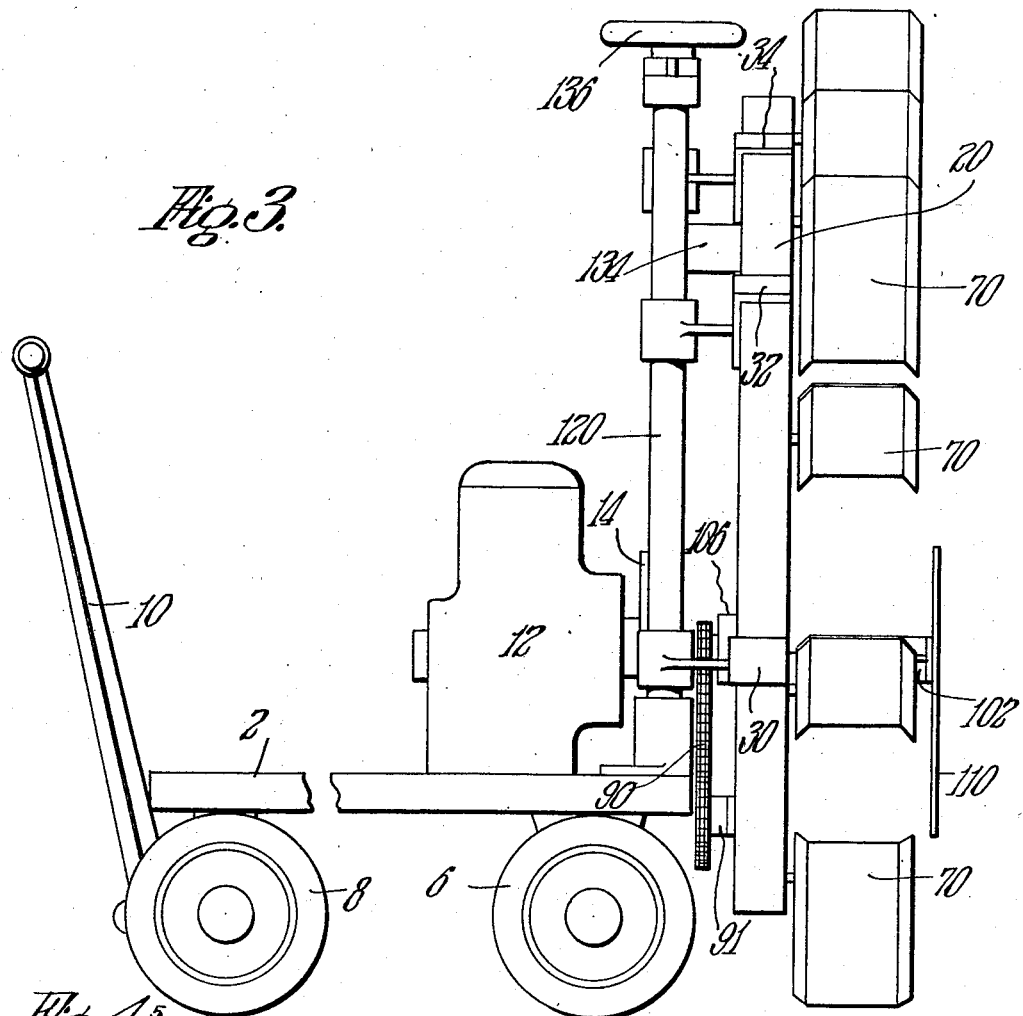
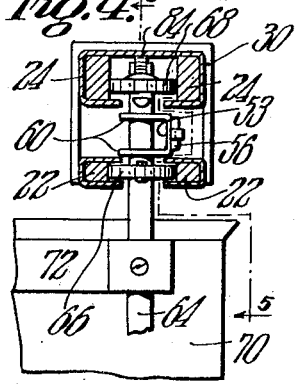
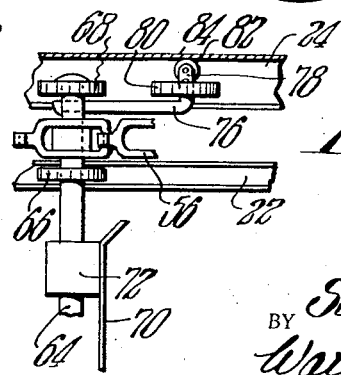

Patented Aug. 8, 1944

2,355,160

UNITED STATES PATENT OFFICE 2,355,160

SNOW HANDLING APPARATUS

Sumner M. Hodsdon, Ludlow, Mass.

Application August 6, 1943, Serial No. 497,606

5 Claims. (Cl. 37—45)

This invention relates to improvements in snow handling apparatus.

The novel features of the invention are directed to improvements in portable snow handling apparatus and is characterized by novel mechanism associated with a vehicle for removing snow in a direction transverse to the path of movement of the vehicle.

According to special features of the invention the apparatus includes a track structure having a flexible carrier guided for movements therein with scoops or shovels associated with the carrier. The track structure is constructed and arranged to provide a lower run of the carrier that is substantially horizontally transversely disposed relative to the direction of movement of the apparatus whereby the scoops act similarly to a snow shovel in removing snow towards the side of the roadway or walk.

Various novel objects and advantages of the invention will be hereinafter more fully referred to in connection with the accompanying description of the invention in the form at present preferred.

In the drawings:

Fig. 3 is a side elevational view of the apparatus shown in Fig. 1;

Fig. 4 is a sectional view on the line 4—4 of Fig. 1;

Fig. 5 is a sectional view on the line 5—5 of Fig. 4; and

Fig. 6 is a section through one of the scoops showing a brush associated therewith.

Figure 1:
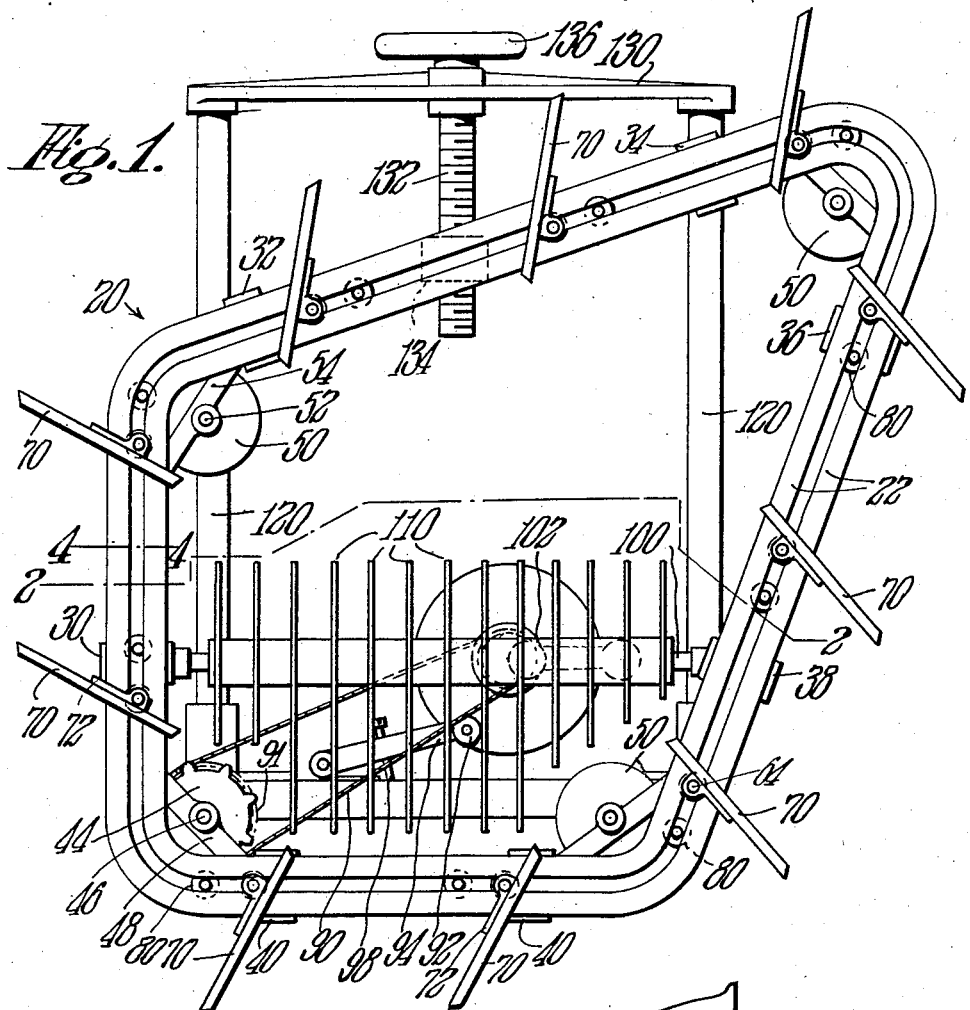
Fig. 1 is a front elevational view of an apparatus for snow removal embodying the novel features of the invention.

Referring now to the drawings more in detail, the invention will be fully described.

A vehicle is shown in Fig. 3 which has a platform 2 supported by wheels 6 and 8 with a handle 10 for moving the vehicle, or for controlling the movements thereof.

The snow handling equipment later to be described is carried by the platform and in normal operation the vehicle is moved to the right in Fig. 3. The end of the vehicle on which the snow handling apparatus is mounted will be called the forward end.

Means for operating the apparatus is provided and in the form of the invention shown is an internal combustion engine 12 having the usual flywheel on the drive shaft thereof. An electric motor may be used, if desired, or other source of power.

A track structure is provided and is represented generally by 20. The track is continuous and it has a pair of outer track sections 22 and a pair of inner track sections 24, see Figs. 4 and 5. The members of the pairs are in the form of channels with the outer pair spaced from the inner pair, as shown. The parts forming the track may be secured together by brackets in the form of U's there being numerous brackets such as 30 to 40 inc. In this manner the several track forming elements are held together to form a strong rigid structure.

A sprocket 44 is fixed to a shaft 46 rotatable in a bracket or brackets 48 secured to the track structure. Idlers 50 are rotatable on shafts 52 fixed in brackets 54 that are fixed to the track structure.

An endless flexible carrier which may take the form of a chain 56 is in engagement with the sprocket 44 and passes around the idlers 50 all of which are so located that the chain is disposed around the track structure. Any type of chain may be used but the form shown as in Fig. 5 includes links 56 having hooks that are hooked into adjacent links.

Plates 58 are carried by certain links of the chain, depending on the spacing desired, and these have depending ears 60. Rods 64 pass through said ears and have rolls 66 and 68 thereon that are disposed so as to run in the pairs of channels constituting the track as shown in Fig. 4.

Scoops 70 have brackets 72 fixed thereto which are fixed to the rods 64 and as the chain is moved counterclockwise in Fig. 1 the scoops are moved in that direction to remove snow from in front of the vehicle by carrying it to the right and more or less upwardly at the side of the apparatus.

To maintain the scoops 70 in their proper position, rods 76 extend from the inner ends of the rods 64 and have end portions 78 on which are rolls 80 that ride in track sections 24 rearwardly of rolls 80.

Other rolls 82 are journalled in the rod parts 78 for riding along the wall 84 of the track sections 24.

The rolls 66 and 68 in their respective channels and the rolls 80 and 82 cooperate to hold the rods 64 and thereby the scoops 70 in proper position so that the scoops on the lowermost run of the chain operate to act on snow and move it to the right in Fig. 1. As the scoops pass upwardly and outwardly at the right the snow is more or less piled up.

A sprocket 88 on the motor shaft is connected by a chain 90 to a sprocket 91 on shaft 46 whereby the chain carrying the scoops is operated.

An idler wheel 92 is carried by a lever 94 pivoted to a bracket 96 and an adjusting screw 98 of the lever engages the platform to serve as a tightening device for the chain 90 should the same be necessary.

A rod 100 extends between brackets 30 and 38 of the track structure and a member 102 has parts 104 slidable on said rod 100. A disc 106 on the motor shaft has a link 108 pivoted thereto in an offset relation and the other end of said link is pivoted to one of the members 104. As the motor shaft rotates the member 102 is reciprocated back and forth.

A plurality of vertically disposed members 110 are carried by the member 102 and the parts are preferably so arranged that the members 110 are reciprocated back and forth forwardly of or in advance of the scoops 70 for the purpose of breaking up and loosening snow to be acted upon by the scoops.

Figure 2:
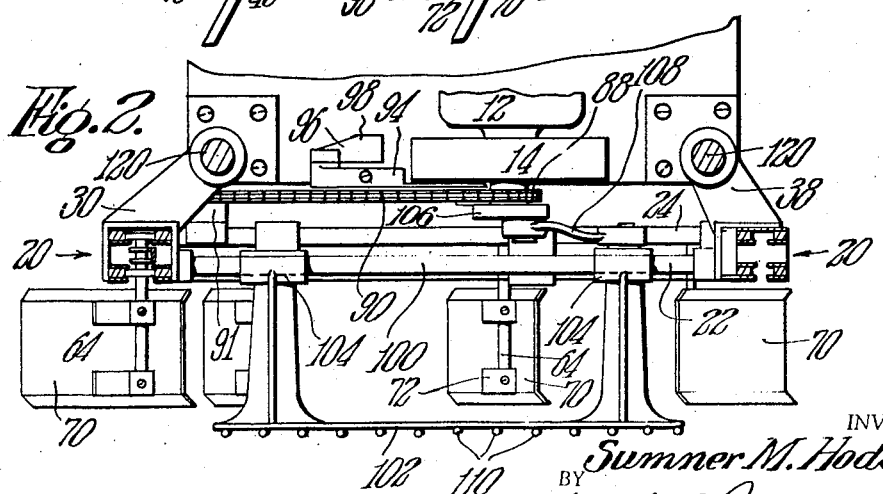
Fig. 2 is a sectional plan view on the line 2—2 of Fig. 1.

Rods 120 extend upwardly from the platform and the brackets 30, 32, 34 and 38 have hub parts that are slidable up and down thereon, see Figs. 2 and 3. By this means the track structure may be raised and lowered to position the scoops 70 in the lower run of the chain as may be desired relative to the walk or roadway.

A bar 130 extends between the rods 120 and a screw 132 rotatable therein is in threaded engagement with a bracket 134 on the track structure so that by rotating the screw 132 by means of a handwheel 136 the track structure may be raised and lowered.

As stated, the normal direction of movement in the operation of the apparatus is to the right in Fig. 3. The track structure which may be raised and lowered at the forward end of the vehicle is such that the chain carrier is guided so as to have a lower horizontal run disposed transversely to the direction of movement and that extends into an angularly disposed run. With such an arrangement, the scoops move the snow to the right of the apparatus and upwardly so as to pile it to the right in Fig. 3.

The members 110 function as means to break up the snow in front of the vehicle as it advances so that it is easily handled by the scoops.

In some cases it may be desirable to provide brushes 140 on the ends of the scoops as in Fig. 6 which may be arranged to sweep the roadway or walk as the scoops traverse the same.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Snow handling apparatus comprising in combination, a wheeled vehicle, a track structure on said vehicle for supporting and guiding a continuous flexible carrier member so that it has a lower substantially horizontal run disposed transversely to the direction of movement of said vehicle, scoops carried by said carrier, agitating means mounted on the track structure for movement in opposite directions in planes parallel to the path of movement of the carrier, and operating means for said carrier member and agitating means.

2. Snow handling apparatus comprising in combination, a wheeled vehicle, a track structure on said vehicle for supporting and guiding a continuous flexible carrier member so that it has a lower substantially horizontal run disposed transversely to the direction of movement of said vehicle, scoops carried by said carrier, agitating means mounted on the track structure for movement in opposite directions in planes parallel to the path of movement of the carrier, and operating means for said carrier member and agitating means, said agitating means disposed adjacent the outer side of said scoops.

3. Snow handling apparatus comprising in combination, a wheeled vehicle, a track structure on said vehicle for supporting and guiding a continuous flexible carrier member so that it has a lower substantially horizontal run disposed transversely to the direction of movement of said vehicle, scoops forwardly of and outside said track structure and means connecting the same to said carrier member, agitating means disposed adjacent the forward sides of said scoops mounted on said track structure for movements back and forth in planes parallel to the path of movement of said carrier member, and operating means for said carrier member and agitating means.

4. Snow handling apparatus comprising in combination, a wheeled vehicle movable in a certain direction, a track structure mounted for vertical reciprocating movements on said vehicle and means to reciprocate the same, said track structure supporting and guiding a flexible carrier member so that it has a lower horizontal run disposed transversely to the direction of movement of the vehicle, scoops forwardly and outside of said track structure and means connecting the same to the carrier member, agitating means disposed adjacent the forward sides of said scoops mounted on the track structure to move back and forth in planes parallel to the path of movement of said carrier member, and operating means for said carrier member and agitating means.

5. Snow handling apparatus comprising in combination, a wheeled vehicle movable in a certain direction, a track structure mounted for vertical reciprocating movements on said vehicle and means to reciprocate the same, said track structure supporting and guiding a flexible carrier member so that it has a lower horizontal run disposed transversely to the direction of movement of the vehicle, scoops forwardly and outside of said track structure and means connecting the same to the carrier member, agitating means disposed adjacent the forward sides of said scoops mounted on the track structure to move back and forth in planes parallel to the path of movement of said carrier member, and operating means for said carrier member and agitating means, said agitating means including a main member having spaced members secured thereto.

SUMNER M. HODSDON.